United States Patent
Gu et al.

(10) Patent No.: US 11,909,620 B2
(45) Date of Patent: Feb. 20, 2024

(54) SYSTEMS AND METHODS FOR CLOUD-NATIVE NETWORK SLICING AND TESTING-AS-A-SERVICE WITH CONTINUOUS INTEGRATION AND CONTINUOUS DELIVERY (CI/CD) CAPABILITIES

(71) Applicant: DISH WIRELESS L.L.C., Englewood, CO (US)

(72) Inventors: Chris Yonghai Gu, Thornton, CO (US); Marc Rouanne, Cherry Hills Village, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/971,236

(22) Filed: Oct. 21, 2022

(65) Prior Publication Data
US 2023/0127800 A1    Apr. 27, 2023

Related U.S. Application Data

(60) Provisional application No. 63/270,993, filed on Oct. 22, 2021.

(51) Int. Cl.
*H04L 43/50*  (2022.01)
*H04L 41/12*  (2022.01)
(Continued)

(52) U.S. Cl.
CPC .............. *H04L 43/50* (2013.01); *H04L 41/12* (2013.01); *H04L 41/145* (2013.01); *H04L 43/12* (2013.01);
(Continued)

(58) Field of Classification Search
CPC ..... H04W 16/22; H04W 24/08; H04W 24/06; H04L 41/145; H04L 43/55; H04L 43/50;
(Continued)

(56) References Cited

U.S. PATENT DOCUMENTS

2016/0103698 A1\*  4/2016  Yang .................. G06F 11/2048
                                                                 718/1
2021/0021462 A1\*  1/2021  Chaignon .......... H04L 41/0897
(Continued)

OTHER PUBLICATIONS

"Methods for Testing and Specification (MTS); Deployment of Model-Based Automated Testing Infrastructure in a Cloud", Technical report, vol. MTS, No. V1.1.1, 2016.
(Continued)

*Primary Examiner* — Glenton B Burgess
*Assistant Examiner* — Rachel J Hackenberg
(74) *Attorney, Agent, or Firm* — Jeremiah J. Baunach; VLP Law Group LLP

(57) ABSTRACT

A topology-reprogrammable test environment is provided that can support the needs of CI/CD/CV in the field. The system disclosed provides a highly scalable network architecture to simplify the implementation of network slicing, TaaS and network CI/CD, and solves problems related to the complexity of cloud-native network (CNN) deployments. A Network Cell (NC), comprises or consists of a Containerized Network Function (CNF), a Containerized Digital Twin (CDT), and a Containerized Test Agent (CTA). The CDT has at least two personalities, e.g., an emulator of the CNF in the same NC or a nodal of the CNF. The choice of personality of the CDT is controlled by the CTA of the NC. A number of NCs use a 3D IP address to interconnect and form a new kind of CNN over the infrastructure of VRs.

3 Claims, 10 Drawing Sheets

(51) Int. Cl.
   *H04L 41/14*   (2022.01)
   *H04L 43/12*   (2022.01)
   *G06F 11/36*   (2006.01)

(52) U.S. Cl.
   CPC ...... *G06F 11/3684* (2013.01); *G06F 11/3692* (2013.01)

(58) Field of Classification Search
   CPC .... H04L 43/12; G06F 12/109; G06F 11/3688; G06F 11/3692; G06F 11/3684; G06F 2009/45562; G06F 8/63; G06F 2201/815
   See application file for complete search history.

(56) References Cited

U.S. PATENT DOCUMENTS

| | | | |
|---|---|---|---|
| 2021/0112428 A1 | 4/2021 | Young et al. | |
| 2022/0191648 A1* | 6/2022 | Smith | H04W 4/023 |
| 2022/0237111 A1* | 7/2022 | Stavros | G06F 21/64 |
| 2022/0279420 A1* | 9/2022 | Akkipeddi | H04L 45/04 |

OTHER PUBLICATIONS

"Network Functions Virtualisation (NFV) Testing; Report on CICD and Devops", Etsi Draft Specification; Nfv-Tst 006, 2020, pp. 1-36.
Anonymous: "Improve Software Testing with Containers", Retrieved from: URL:https://www.methodsandtools.com/archive/containertesting.php, 2017.
Anonymous: 5G and the Cloud—A 5G Americas White Paper, Dec. 31, 2019, XP055844938.
International Search Report and Written Opinion received for PCT Patent Application No. PCT/US22/047450, dated Feb. 10, 2023, 10 pages.

* cited by examiner

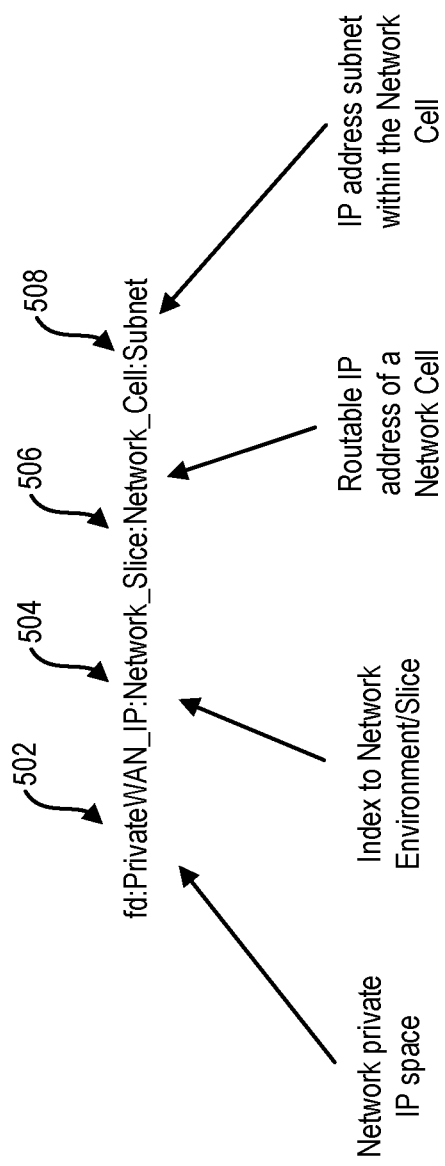

700

ELECTRONICALLY GENERATE A PLURALITY OF NETWORK CELLS, WHEREIN A CTA OF THE NETWORK CELL CONTROLS BEHAVIOR OF A CDT OF THE NETWORK CELL AND THE CDT IS SELECTIVELY CONFIGURABLE BY A CTA OF THE NETWORK CELL TO OPERATE AS AN EMULATOR OF THE CNF OR AS A TEST NODAL OF A CNF
710

ELECTRONICALLY PROVIDE A VIRTUAL ROUTER THROUGH WHICH EACH NETWORK CELL OF THE PLURALITY OF NETWORK CELLS IS ACCESSIBLE BY A TESTING-AS-A-SERVICE (TAAS) ORCHESTRATOR (TO)
715

ELECTRONICALLY DEFINE A NETWORK INTERNET PROTOCOL (IP) ADDRESS CODING SCHEME FOR EACH NETWORK CELL OF THE PLURALITY OF NETWORK CELLS ENABLING, FOR EACH NETWORK CELL OF THE PLURALITY OF NETWORK CELLS TO HAVE A RESPECTIVE UNIQUE IP SUBNET OF THE NETWORK CELL AND THE CNF INCLUDED INSIDE THE NETWORK CELL TO BE DIRECTLY ACCESSED BY THE TO VIA THE VIRTUAL ROUTER
720

ELECTRONICALLY DEPLOY EACH NETWORK CELL OF A PLURALITY OF NETWORK CELLS OF THE AT LEAST ONE NETWORK SLICE USING A RESPECTIVE UNIQUE IP SUBNET OF THE NETWORK CELL TO FORM A CNN VIA THE VIRTUAL ROUTER
725

ELECTRONICALLY CLONE THE CLOUD-NATIVE NETWORK TO FORM AT LEAST ONE NETWORK SLICE
730

ELECTRONICALLY MANAGE THE CI/CD OF THE CLOUD-NATIVE NETWORK BY THE TO, WHEREIN THE TO IS INTERCONNECTED WITH THE NO
735

SELECTIVELY ACTIVATE DIFFERENT SETS OF CDTS WITHIN THE PLURALITY OF NETWORK CELLS, THEREBY FORMING DIFFERENT NETWORK TESTING TOPOLOGIES TO PERFORM NETWORK TESTING OF THE CLOUD-NATIVE NETWORK
740

FIG. 7

SYSTEMS AND METHODS FOR CLOUD-NATIVE NETWORK SLICING AND TESTING-AS-A-SERVICE WITH CONTINUOUS INTEGRATION AND CONTINUOUS DELIVERY (CI/CD) CAPABILITIES

BRIEF SUMMARY

To assure the success of the Cloud-Native Network (CNN) implementation (e.g., a Fifth Generation (5G) New Radio (NR) network deployed in a hybrid cloud environment), it is important to perform continuous validation (CV) and testing using test software applications in a large scale in live network instances (slices) to touch every instance of Containerized Network Function (CNF) in combination of all practically possible network topologies.

Traditionally, the network topology design (network IP assignment) and network Test-as-a-Service (TaaS) for CV are developed through separated processes due to different network development priorities. In such instances, TaaS is more like an add-on design. The Implementation of TaaS becomes challenged in scalability due to the actual network IP address schemes having been in place. As a consequence, it is difficult to deploy TaaS test agents throughout the network, difficult to implement CV strategy, very costly or event impossible to implement certain TaaS test cases, inefficient to implement network continuous integration and continuous delivery (CI/CD) and slicing (orchestration) when the network is ready for commercial applications.

Furthermore, network node testing in the laboratory (lab) is traditionally done according to two categories: functional testing and performance testing. It is often the case that the network node worked well in the lab but then fails in the field. Additionally, network testing in the lab is traditionally done in combinations of functional testing and performance testing under a given network topology. It is also often the case that the network worked well in the lab but then fails in the field.

The root causes for such failures in network node testing and network testing are that the network topology in the field differs from what used in the lab for testing. Thus, as a solution to this problem, disclosed herein is a topology-reprogrammable test environment that can support the needs of CI/CD/CV in the field. Here the term "field" is generic, and means actual physical location or a service cloud of a network. The system disclosed provides a highly scalable network architecture to simplify the implementation of network slicing, TaaS and network CI/CD, and solves problems related to the complexity of CNN deployments.

BRIEF DESCRIPTION OF THE SEVERAL VIEWS OF THE DRAWINGS

FIG. 5 is a diagram showing an example network IPv6 address coding scheme for a CNN, according to various embodiments of the present disclosure.

FIG. 7 is a flow diagram of an exemplary process for testing of a CNN with continuous integration and continuous delivery (CI/CD), according to various embodiments of the present disclosure.

DETAILED DESCRIPTION

A CNN may comprise a number of CNFs interconnected through Virtual Routers (VRs). The IP addresses of CNFs and the routing roles of VRs determine the topology of the actual CNN. A CNN can be cloned in the cloud to form a new network, which is often called a Network Slice (NS) or a Network Environment (NE). Testing a CNN or NS involves embedding Containerized Test Servers (CTS) in them. Those CTSs can be configured to emulate one kind of CNFs to test other CNFs within the specified CNN, NS or NE.

A CNN may be deployed first, tested and cloned for NS or NE later when needed. CTSs may be inserted or deployed on top of those CNN, NS and/NE later when they are needed. Such a later, add-on approach causes many engineering challenges in practice since the insertion/add-on of CTSs usually requires IP address changes and VR routing adjustments. Those changes and adjustments are costly in terms of engineering. Such process also severely limits the actual scalability of the CNN or NS.

To solve such technical problems, systems and methods disclosed herein provide an architecture that simplifies the CNN, NS and/or NE creation process, and maximizes the value of Test as a Service (TaaS) technologies to create a better CNN/NS/NE in a more cost-effective way.

In an example embodiment, an NC, comprises or consists of a Containerized Network Function (CNF), a Containerized Digital Twin (CDT), and a Containerized Test Agent (CTA). The CDT has at least two personalities, e.g., an emulator of the CNF in the same network cell (NC) or a nodal of the CNF. The choice of personality of the CDT is controlled by the CTA of the NC. A number of NCs use a 3D IP address scheme as disclosed herein to interconnect and form a new kind of CNN over the infrastructure of VRs.

Figure 1A:
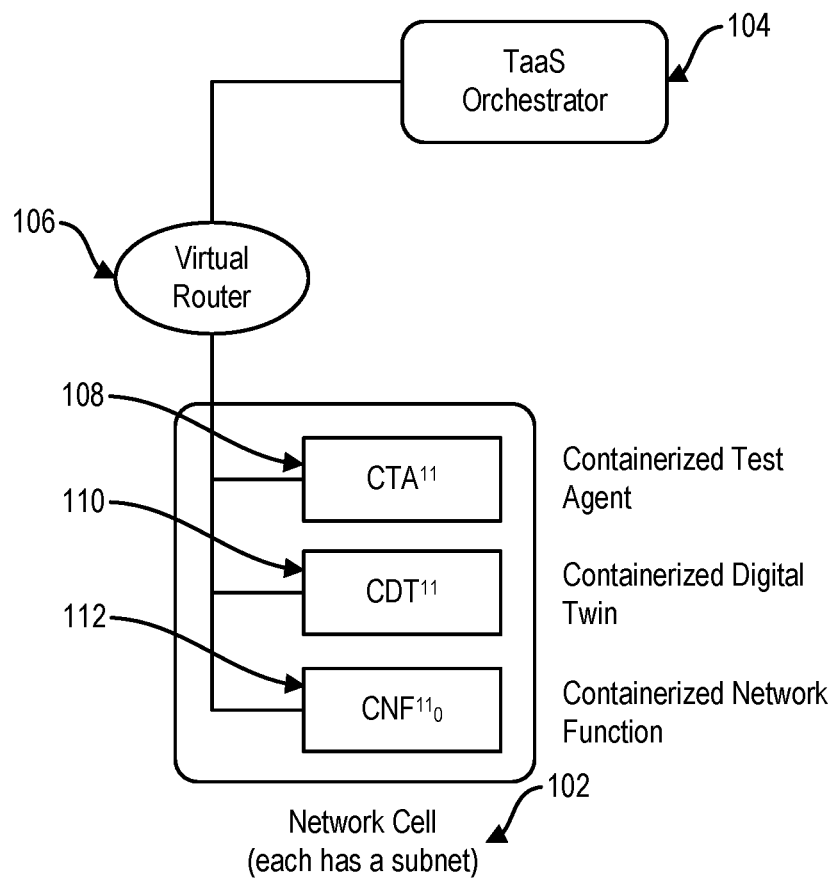
FIG. 1A is a block diagram showing an example network cell (NC) of a CNN under test, according to various embodiments of the present disclosure.

FIG. 1A is a block diagram showing an example NC 102 of a CNN under test, according to various embodiments of the present disclosure. A TaaS orchestrator 104 and a number of NCs are interconnected through the virtual router (VR) 106 of the network infrastructure of a network under test as shown in FIG. 1A. In an example embodiment, the network under test may be a Fifth Generation (5G) New Radio (NR) network as defined by the 3rd Generation Partnership Project (3GPP) that defines the global specifications for 3G UMTS, 4G LTE, and 5G technologies. For example, the 5G NR network may be deployed or otherwise provided by a mobile network operator or mobile virtual network operator, such as a wireless communications services provider.

Figure 2:
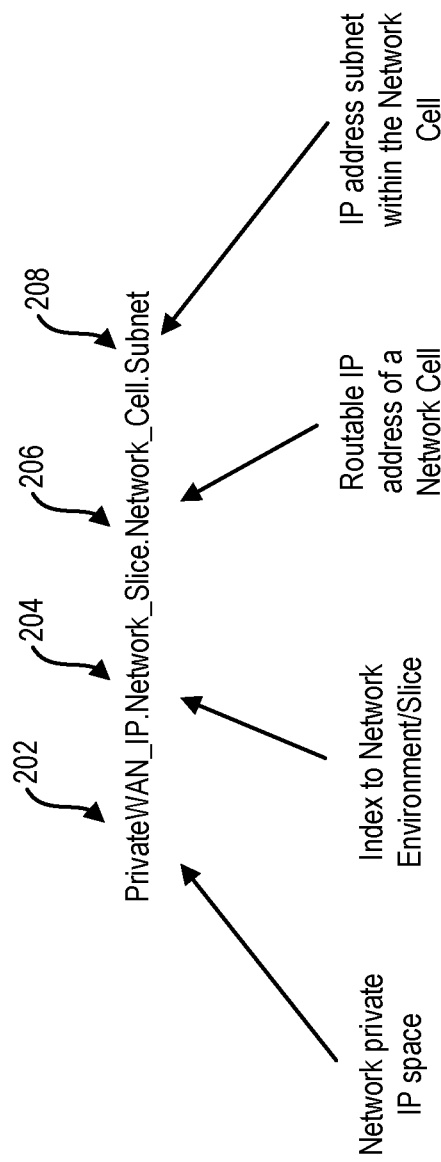
FIG. 2 is a diagram showing an example network IP address coding scheme for a CNN under test, according to various embodiments of the present disclosure.

As shown in FIG. 1A, an NC 102 may comprise or consist of: a CTA 108, a CDT 110 and a CNF 112. The CTA 108 controls the behavior of the CDT 110 in each NC 102. The CDT 110 has two personalities, which can be programmed by the CTA 108: Emulator of the CNF and Test Nodal of the CNF. A 3 dimensional (3D) network IP address coding scheme, such as that shown in FIG. 2, is defined for each NC so that each NC has its own IP subnet, and each Function inside the NC 02 can be directly accessed throughout the network through virtual routers (as shown in FIG. 1A).

Each NC 102 may be deployed like any regular CNF 112 per the network operator's current network design but uses the subnet address instead. The TaaS Orchestrator 104 configures and manages the test network topology through the CTA 108 in each NC 102.

Figure 1B:
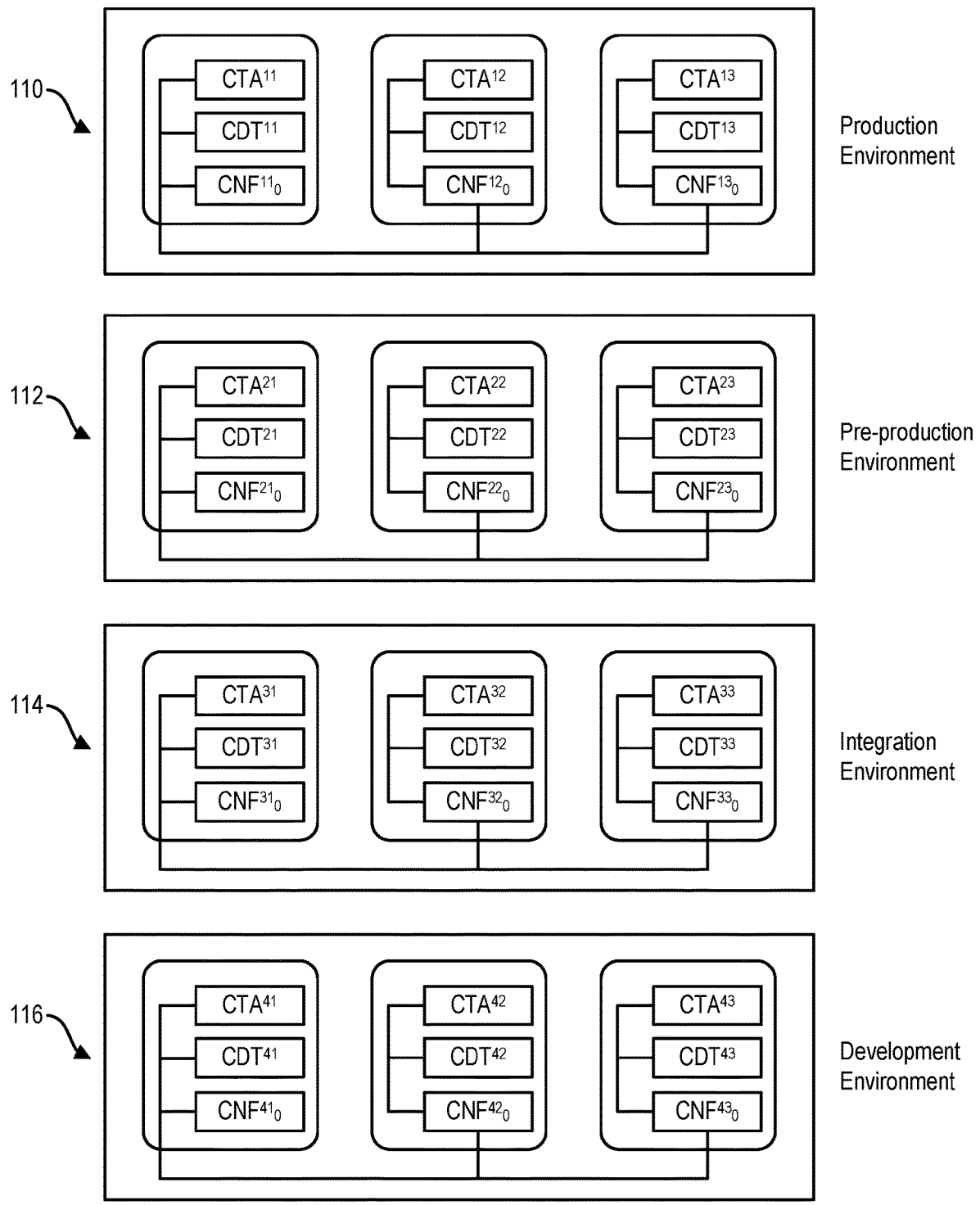
FIG. 1B is a diagram showing example network slices (NSs) of a CNN under test, each for different testing environments and each including a plurality of NCs, according to various embodiments of the present disclosure.

FIG. 1B is a diagram showing example NSs of a CNN under test, each for different testing environments and each including a plurality of NCs, according to various embodiments of the present disclosure. Four example NSs are shown in FIG. 1B. However, fewer or additional NSs may be generated in various different embodiments for various different testing environment by cloning the CNN (i.e. the production environment). In the example shown in FIG. 1B, a different NS is generated for the development environment 116, the integration environment 114, the pre-production environment 112 and the production environment 110. Each NS has its own set of respective NCs cloned from the production environment 110.

According to an example embodiment, when a NS/environment is created, the entirety of all the NCs of the network are cloned, so that the network becomes a network of NCs instead of CNFs only. A special 3D IP address coding scheme, such as that shown in FIG. 2, is defined and utilized to associate NCs for easy routing. A centralized TaaS Orchestrator (TO) is used to define/manage the Network Topology under test for TaaS execution. In one example embodiments, the TaaS Orchestrator works with IBM Orchestrator, for example, to manage network slicing and CI/CD process in general. The TO activates/disables the digital twin in each NC based on actual TaaS testing patterns.

Figure 1C:
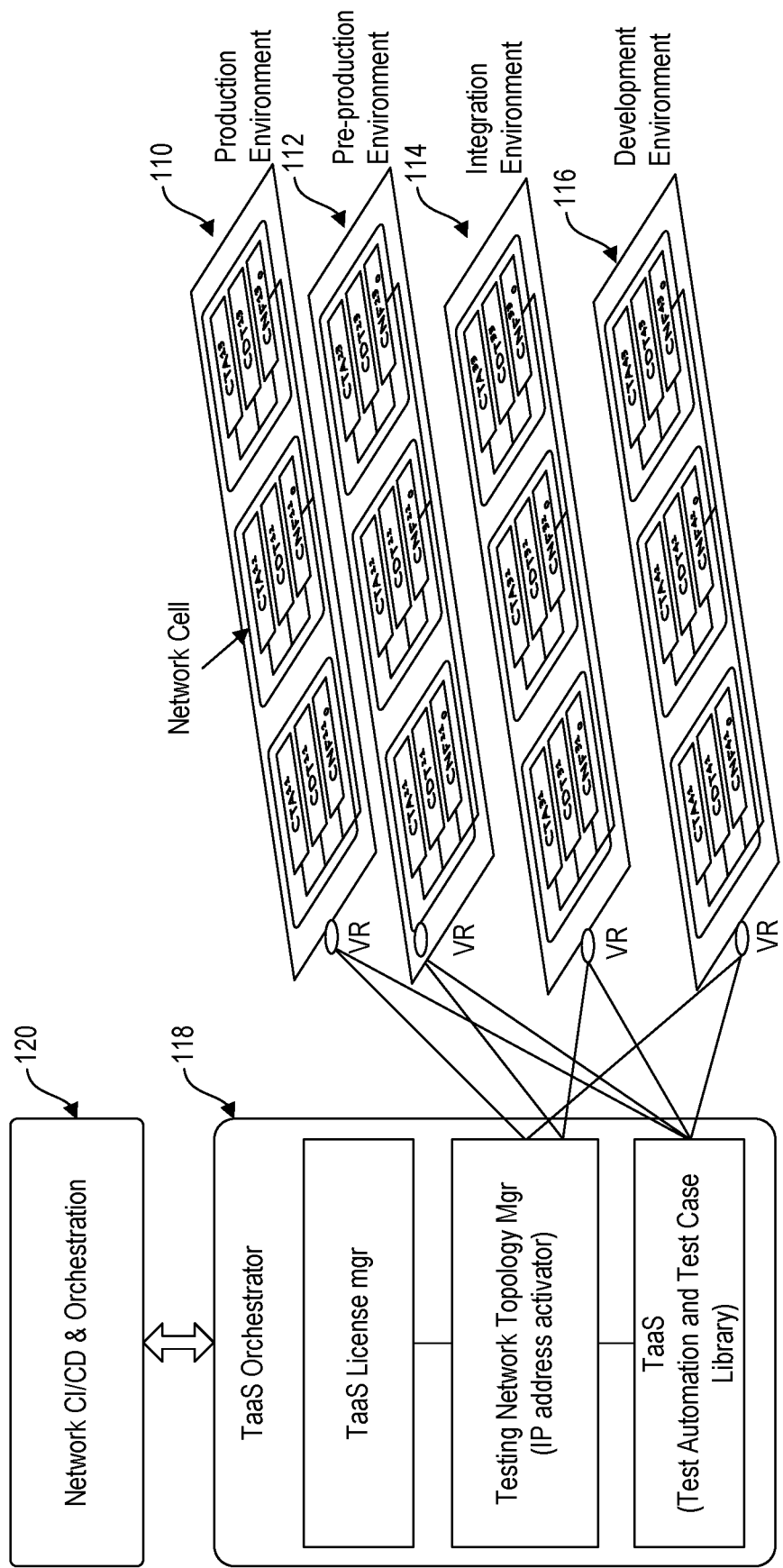
FIG. 1C is a diagram showing an example of addressable network slices of a CNN under test, each for different testing environments and each individually interconnected with a testing-as-a-service (TaaS) orchestrator (TO), according to various embodiments of the present disclosure.

FIG. 1C is a diagram showing an example of addressable NSs of a CNN under test, each for different testing environments and each individually interconnected with a testing-as-a-service (TaaS) orchestrator (TO) 118, according to various embodiments of the present disclosure. In the example, embodiment, the NSs and respective NCs use the 3D Network IP address Scheme as shown in FIG. 2 to simplify the implementation of NS, TaaS and CI/CD.

The TaaS Orchestrator (TO) 118 is interconnected with a Network Orchestrator (NO) 120. The TO 118 communicates with the CTA of each NC in the CNN so that the TO can activate the personality of CDTs in NCs in the CNN according to the needs of network testing or other services. As a result of the independence of all the CDTs in the CNN, the TO can activate sets of CDTs through an IP address management to form different network testing topologies (patterns) to perform the network testing in very flexible and manageable ways. This dramatically improves flexibility as well as reduces the overall testing costs.

According to an example embodiment, another feature of the CNN is the easy cloning to create a new kind of NS or NE based on NCs rather than CNFs. To simplify the TO operations, according to an example embodiment, a 3D IP address coding scheme is used, such as that shown in FIG. 2, based on which the TO 118 can easily communicate with CTAs in NCs over any VRs. The three dimensional (3D) IP address coding scheme, such as that shown in FIG. 2, specifies how to embed the NS or NE identifications, the IP address subnets within NSs or NEs, and the subnets within NSs or NEs. In other words, the TO 118 can communicate with any containerized functions within any NC only based on IP address, which dramatically simplifies the TaaS, network slicing and/or network CI/CD processes, consequently resulting in significant cost savings of CNN engineering and operations.

FIG. 2 is a diagram showing an example network IP address coding scheme for a CNN under test, according to various embodiments of the present disclosure. According to one embodiment, an example 3D IP address coding scheme for the network under test is: PrivateWAN_IP.Network_Slice.Network_Cell.Subnet. The "PrivateWAN_IP" portion 202 identifies or provides a private IP space for the network to build for production or under test (e.g., 5G network). The "Network_Slice" portion 204 is an index to the particular network environment/slice of the network under test. The "Network_Cell" portion 206 provides a routable IP address for an individual NC of a particular NS identified by the "Network_Slice" portion 204. The "Subnet" portion 208 provides an IP address subnet within the NC. The three dimensional (3D) IP address coding scheme, shown specifies how to embed the NS or NE identifications, the IP address subnets within NSs or NEs, and the subnets within NSs or NEs. This enables the TO to communicate with any containerized functions within any NC of any NSs only based on IP address.

Figure 3:
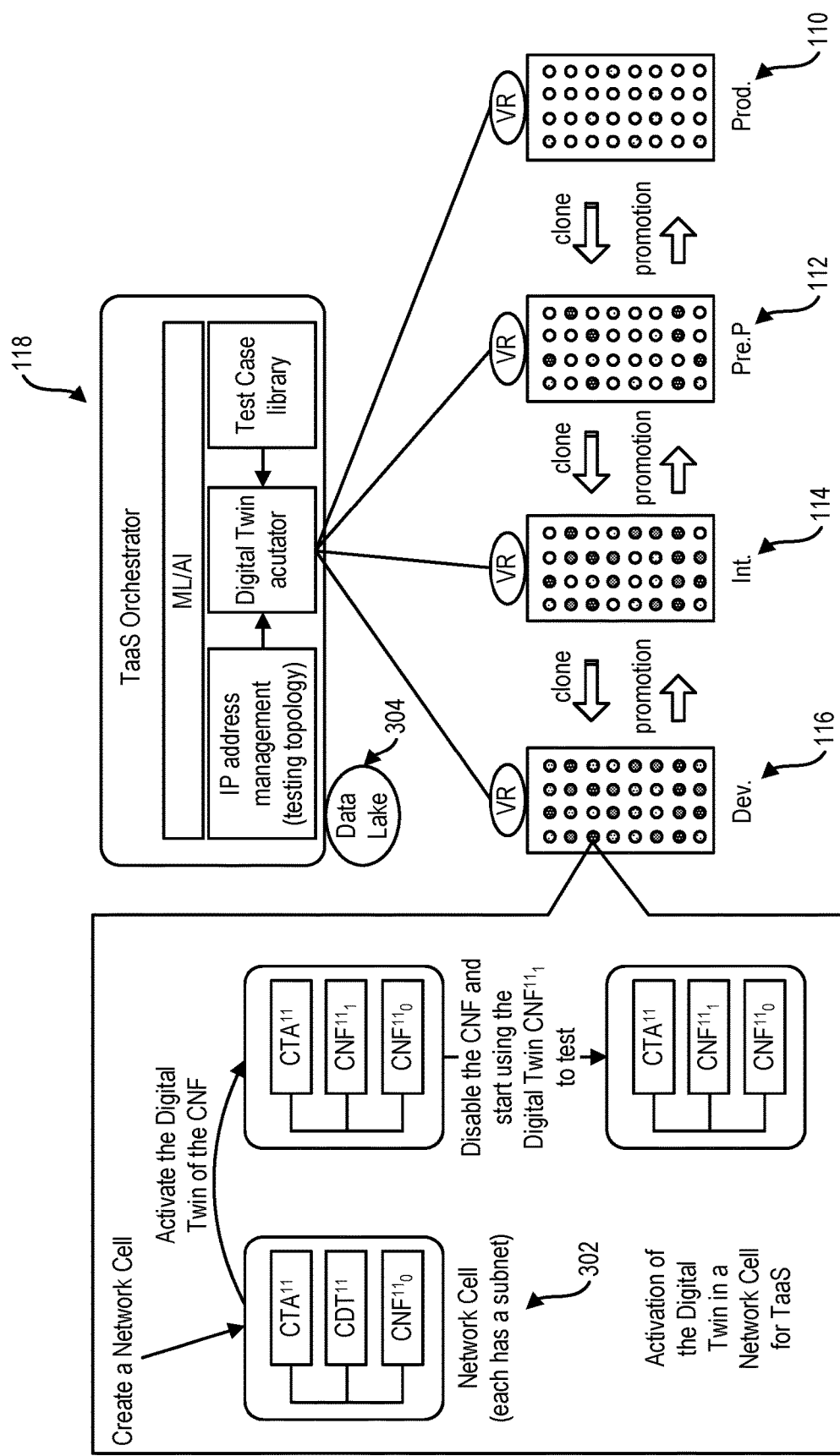
FIG. 3 is a diagram showing how example NCs of a CNN supports TaaS, according to various embodiments of the present disclosure.

FIG. 3 is a diagram showing how example NCs of a CNN supports TaaS, according to various embodiments of the present disclosure. Each color dot stands for an active NC in FIG. 3. Progressing moving from the development environment NS on the left to the production environment NS on the right fewer and fewer CDTs of NCs are shown as active. The network of the NCs implements the topology of the network under test, the network of the NCs with active CDTs implements the topology of actual testing, which may be defined and managed by the TaaS Orchestrator, which also plays an important role in the network under test (e.g., 5G network) CI/CD Automation.

As shown in FIG. 3, the TaaS Orchestrator clones/promotes an NC 302 for NEs (slicing), defines testing network topology (per TaaS), activates the CDT to produce the testing personality (emulator or nodal) and executes Test Cases and record test data into the Data Lake 304. The TaaS Orchestrator may also implement Machine Learning or other Artificial Intelligence (AI) models of test network topology patterns for AI-based automation feedback. Such Machine Learning or other artificial intelligence models may improve and/or otherwise modify such testing operations bases on training provided from test results, training datasets and other feedback.

Figure 4A:
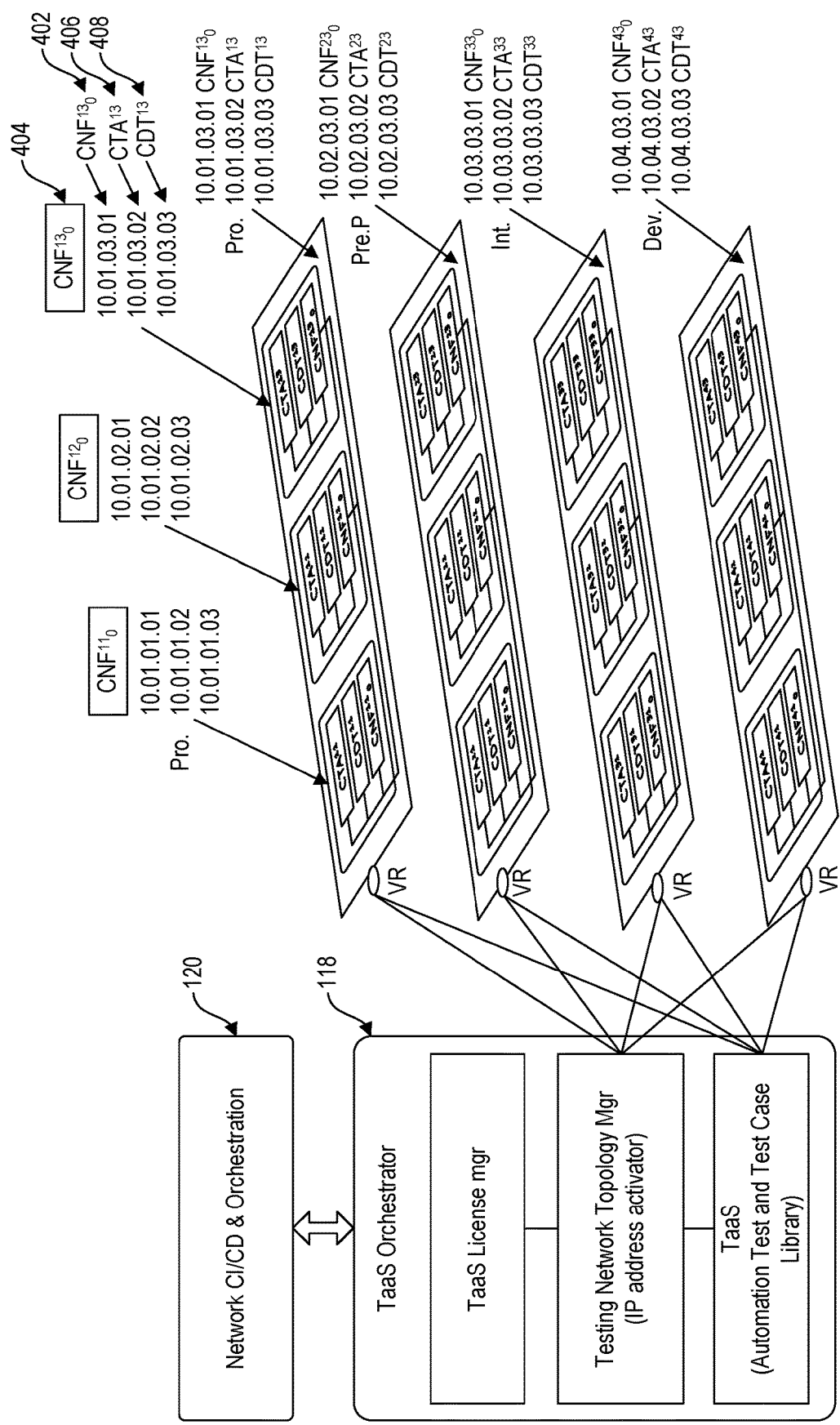
FIG. 4A is a diagram showing an example of network IPv4 address coding for an example CNN under test, according to various embodiments of the present disclosure.

FIG. 4A is a diagram showing an example of network IPv4 address coding for an example CNN under test, according to various embodiments of the present disclosure. For example, using the network IP address coding scheme of FIG. 2, the IP address of $CNF^{13}_0$ 402 associated with the NC containing $CNF^{13}_0$ 404 is 10.01.03.01, the IP address of $CTA^{13}_0$ 406 associated with the NC containing $CNF^{13}_0$ 404 is 10.01.03.02 and the IP address $CDT^{13}_0$ 408 associated with the NC containing $CNF^{13}_0$ is 10.01.03.03. The "PrivateWAN_IP" portion and the "Network_Slice" portion of the IP address identifies the particular NS within the private IP space for the network. For example, "10.01" identifies the production environment NS, "10.02" identifies the pre-production environment NS, "10.03" identifies the integration environment NS and "10.04" identifies the development environment network slice. Furthermore, the "Network_Cell" portion provides a routable IP address for an individual NC of a particular NS identified by the "Network_Slice" portion. For example, the "0.03" portion of "10.01.03.02" points to the individual NC containing $CNF^{13}_0$. Lastly, the "Subnet" portion provides an IP address subnet within the NC to identify a particular function contained within the individual NC (e.g., CNF, CTA or CDT). For example, the "0.02" portion of "10.01.03.02" points to the individual $CTA^{13}$ 406 in the NC containing $CNF^{13}_0$ 404.

Figure 4B:
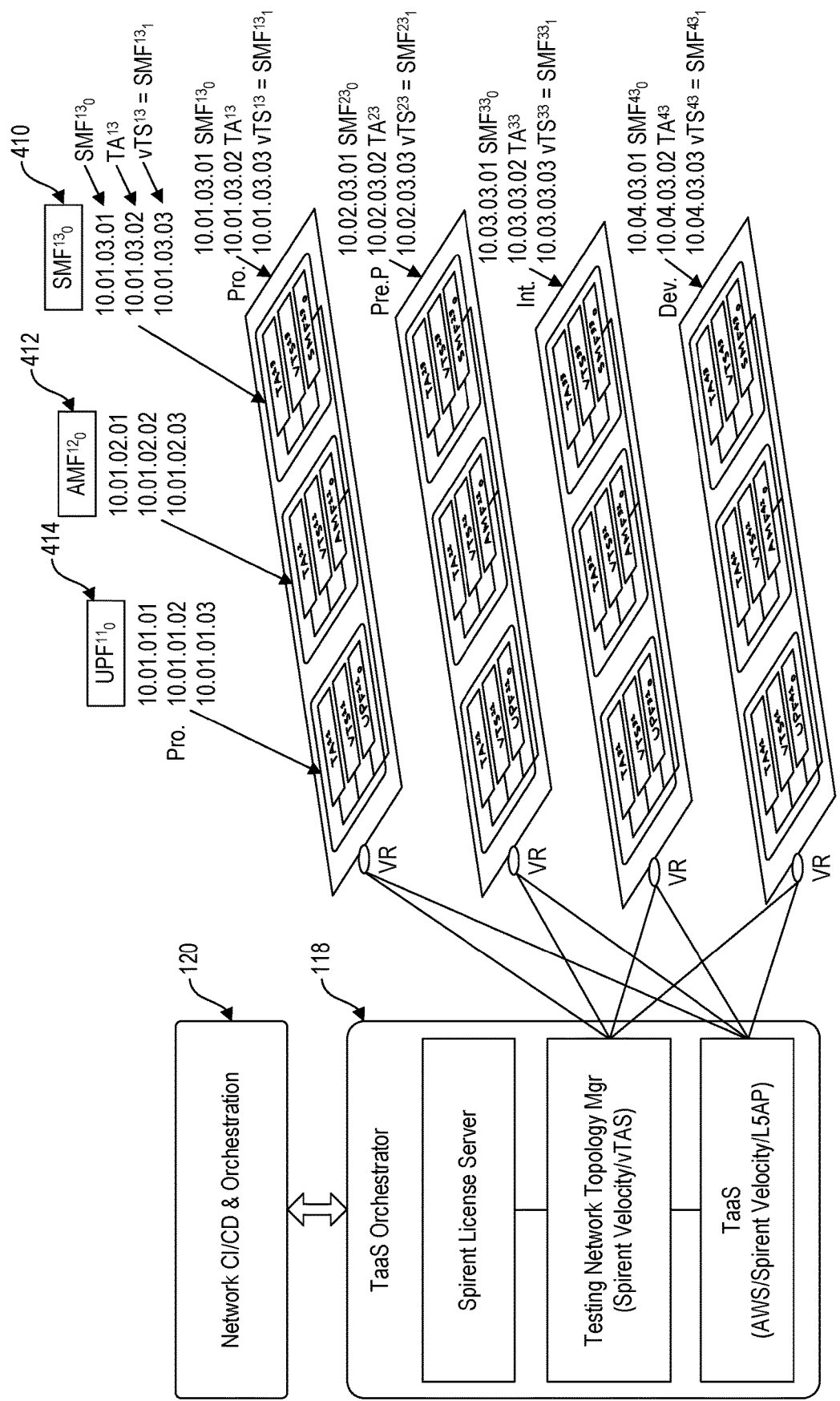
FIG. 4B is a diagram showing an example of using Spirent Landslide vTS as a Containerized Digital Twin (CDT) to emulate an example containerized network function (CNF) and perform automated testing through Velocity test agent (TA) served as a containerized test agent (CTA), according to various embodiments of the present disclosure.

FIG. 4B is a diagram showing an example of using Spirent Landslide Virtual Test Server (vTS) available from Spirent Communications plc, working as a CDT, to emulate an example CNF using the systems and methods disclosed herein and perform automated testing through Velocity test agent (TA) available from Spirent Communications plc, working as a CTA, using the systems and methods disclosed herein, according to various embodiments of the present disclosure. In an example embodiment, the TaaS Orchestrator (TO) 118 may use Spirent Landslide vTS software available from Spirent Communications plc to emulate CNF (e.g., of a 5G network under test) and perform automated test through Velocity test agent (TA) available from Spirent Communications plc and provide TaaS. The TO 118 may access such software via a Spirent License server in real-time on demand. However, the testing network topology manager may utilize different network emulation and testing software and modules to selective activate IP addresses of various CDTs of the NCs in different embodiments.

For example, as shown in FIG. 4B, the CNF in a particular NC of a given NS may be that of a 5G Session Management Function (SMF) 410 in a 5G network under test, an Access and Mobility Management Function (AMF) 412 in a 5G network under test or a User Plane Function (UPF) 414 in a 5G network under test. Correspondingly, the CTA in a particular NC of a given NS may be a Velocity test agent (TA) and the CDT in a particular NC of a given NS may be that of a Spirent Landslide Virtual Test Server (vTS), which can emulate the control and data traffic of mobile subscribers moving through the 5G network.

FIG. 5 is a diagram showing an example network IPv6 address coding scheme for a CNN, according to various embodiments of the present disclosure. The example network IPv6 address coding scheme provides more capacity for providing further addressable NCs, including addressable CNFs, CDT's and CTAs. According to one embodiment, an example IPv6 address coding scheme for a CNN is: fd:PrivateWAN_IP:Network_Slice:Network_Cell:Subnet. The "PrivateWAN_IP" portion 502 identifies or provides a private IP space for the CNN. The "Network_Slice" portion 504 is an index to the particular network environment/slice of the CNN. The "Network_Cell" portion 506 provides a routable IP address for an individual NC of a particular NS identified by the "Network_Slice" portion 504. The "Subnet" portion 508 provides an IP address subnet within the NC.

Figure 6:
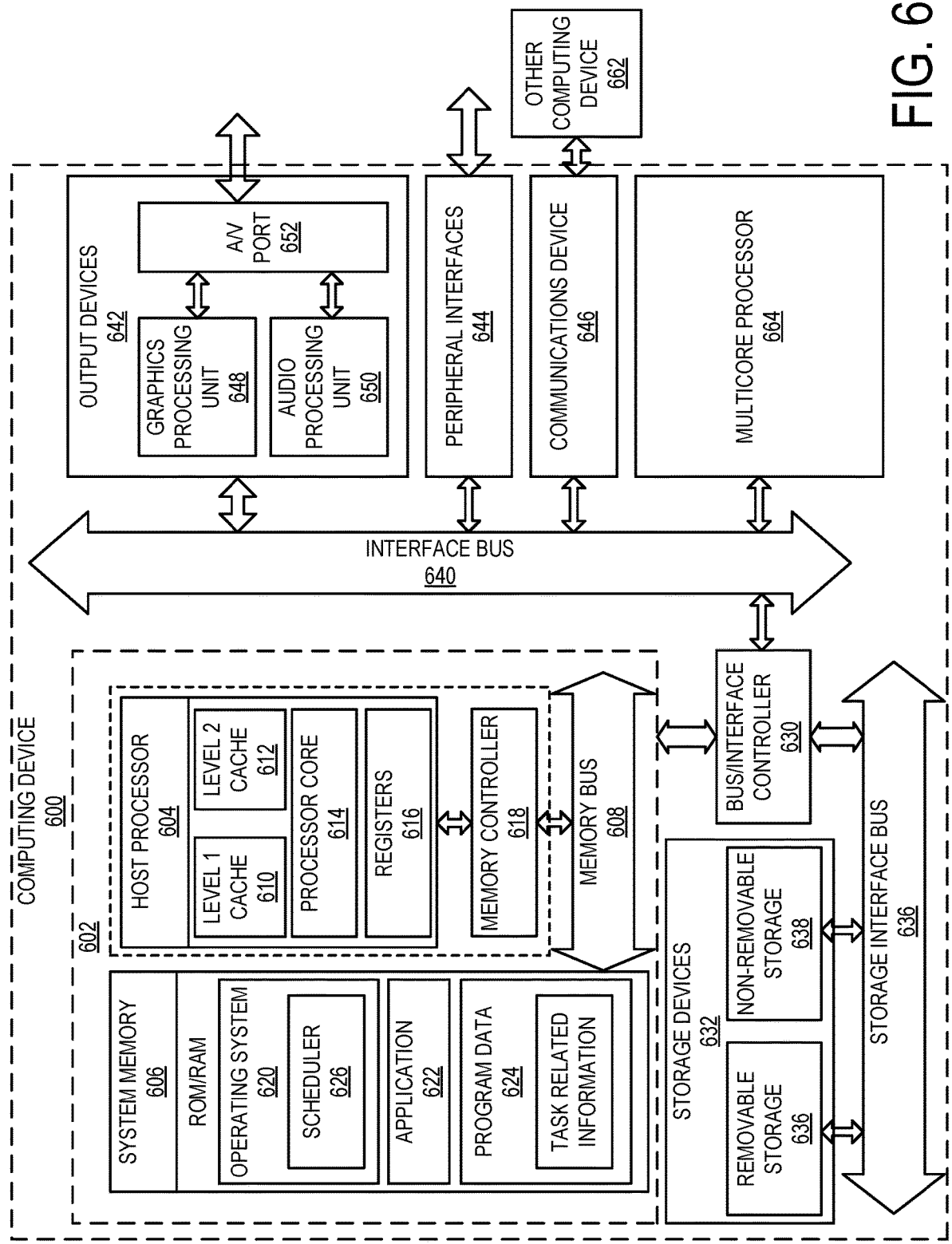
FIG. 6 is a block diagram of an example computing device on which systems and methods for CNN slicing and TaaS with CI/CD capabilities may be implemented, arranged in accordance with at least some embodiments of the present disclosure.

FIG. 6 is a block diagram of an example computing device on which systems and methods for CNN slicing and TaaS with CI/CD capabilities may be implemented, arranged in accordance with at least some embodiments of the present disclosure. In an example configuration, computing device 600 typically includes one or more host processors 604 and a system memory 606. A memory bus 608 may be used for communicating between host processor 604 and system memory 606.

Depending on the desired configuration, host processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. In some implementations, the operating system 620 may have a scheduler 626 and be arranged to run one or more applications 622 to perform the functions as described herein including those described with respect to at least the processes and functionality shown in FIGS. 1A-5 and 7. Also, application 622 may be arranged to operate with program data 624 on operating system 620. Program data 624 may include task related information, such as, without limitation, task data related to executing instructions for performing CNN slicing and TaaS with CI/CD capabilities as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices and hard-disk drives (HDD), optical disk drives such as compact disk (CD) drives or digital versatile disk (DVD) drives, solid state drives (SSD) to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, discs, or other optical storage or other magnetic storage devices, or any other non-transitory storage medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller or a parallel interface controller, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller, which may be arranged to facilitate communications with one or more other computing devices 662, over a network communication link, such as over the network(s) shown in FIG. 1C, via one or more communication ports. In some implementations, computing device 600 includes a multi-core processor 664, which may communicate with the host processor 604 through the interface bus 640.

The network communication link may be made over communication system 106 and may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a server, a network device, a portion of a small-form factor portable (or mobile) electronic device such as a cell phone, a smartphone, a personal data assistant (PDA), tablet device, an application specific device, or a hybrid device that include any of the above functions. Computing device 600 may also be implemented as a personal computer including both laptop computer and non-laptop computer configurations.

There is little distinction left between hardware and software implementations of aspects of systems. The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes, systems, or other technologies are deployed. For example, if an implementer determines that speed and accuracy are paramount, the implementer may opt for a mainly hardware or firmware vehicle. If flexibility is paramount, the implementer may opt for a mainly software implementation. Yet again, alternatively, the implementer may opt for some combination of hardware, software, with or without firmware.

The detailed description herein sets forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flash drives, a hard disk drive, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A data processing system may be implemented utilizing any suitable commercially available components, such as those found in data computing/communication and/or network computing/communication systems.

Computing device 600 may be in networked environment, such as the environment shown in the figures disclosed herein, in which systems and methods for CNN slicing and TaaS with CI/CD capabilities may be a part, or in which they may be implemented, according to one illustrated embodiment. Communications device 646 may be connected to and communicate over a computer/telecommunications network, telecommunications network, computer network or combination of telecommunications and computer networks, that enables communication between the various devices connected to the network, including, but not limited to, computing device 600 and other computing devices that may comprise the systems described herein. For example, the communications network may include one or more of: a 5G network, the internet, a local area network that uses wireless fidelity (Wi-Fi) high frequency radio signals to transmit and receive data over distances of a few hundred feet. A local area network of the communications network may be a wireless local area network (WLAN) based on the Institute of Electric and Electronic Engineers (IEEE) 802.11 standards. However, other wired and wireless communications networks and protocols may be used to link the various devices and systems shown in FIG. 6.

FIG. 7 is a flow diagram of an exemplary process 700 for testing of a CNN with continuous integration and continuous delivery (CI/CD), according to various embodiments of the present disclosure.

At 710, the system electronically generates a plurality of NCs. Each NC of the plurality of NCs includes: a CTA; CNF; and a CDT of the CNF, wherein the CTA controls behavior of the CDT and the CDT is selectively configurable by the CTA to operate as an emulator of the CNF or as a test nodal of the CNF.

At 715, the system electronically provides a virtual router through which each NC of the plurality of NCs is accessible by a testing-as-a-service (TaaS) orchestrator (TO).

At 720, the system electronically defines a network Internet Protocol (IP) address coding scheme for each NC of the plurality of NCs enabling, for each NC of the plurality of NCs to have a respective unique IP subnet of the NC and the CNF included inside the NC to be directly accessed by the TO via the virtual router. The system may electronically deploy each NC of the plurality of NCs using the respective unique IP subnet of the NC. The TaaS orchestrator may electronically configure and manage a test network topology of the CNN via a respective CTA in each NC of the plurality of NCs.

At 725, the system electronically deploys each NC of a plurality of NCs of the at least one NS using a respective unique IP subnet of the NC to form a CNN. Each NC of the plurality of NCs of the CNN has a respective unique IP subnet of the NC and a respective CNF included inside the NC that is directly accessible by the TO throughout the NS via a respective virtual router associated with the NS.

At 730, the system electronically clones the CNN to form at least one NS.

At 735 a network orchestrator (NO) electronically manages the CI/CD of the CNN, wherein the TO is interconnected with the NO. The TO electronically communicates with a respective CTA of each NC of the plurality of NCs to selectively activate the CDT of the NC to operate as an emulator of the CNF of the NC or as a test nodal of the CNF of the NC according to needs of network testing or other services.

At 740 the TO selectively activates different sets of CDTs within the plurality of NCs, thereby forming different network testing topologies to perform network testing of the CNN.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for slicing and/or testing of a cloud-native network (CNN) with continuous integration and continuous delivery (CI/CD), the method comprising:
electronically generating a plurality of network cells (NCs), wherein each NC of the plurality of NCs includes: a containerized test agent (CTA);
a containerized network function (CNF);
and a containerized digital twin (CDT) of the CNF, wherein the CTA controls behavior of the CDT and the CDT is selectively configurable by the CTA to operate as an emulator of the CNF or as a test nodal of the CNF;
electronically providing a virtual router through which each NC of the plurality of NCs is accessible by a testing-as-a-service (TaaS) orchestrator (TO);
and electronically defining a network Internet Protocol (IP) address coding scheme for each NC of the plurality of NCs enabling, for each NC of the plurality of NCs to have a respective unique IP subnet of the NC and the CNF included inside the NC to be directly accessed by the TO throughout the CNN via the virtual router;
electronically deploying each NC of the plurality of NCs using the respective unique IP subnet of the NC;
the TO electronically configuring and managing a test network topology of the CNN via a respective CTA in each NC of the plurality of NCs;
electronically cloning the CNN to form at least one network slice (NS); electronically deploying each NC of a plurality of NCs of the at least one NS using a respective unique IP subnet of the NC, wherein each NC of the plurality of NCs of the at least one NS has a respective unique IP subnet of the NC and a respective CNF included inside the NC that is directly accessible by the TO throughout the at least one NS via a respective virtual router associated with the at least one NS;
a network orchestrator (NO) electronically managing the CI/CD of the CNN, wherein the TO is interconnected with the NO;
the TO electronically communicating with a respective CTA of each NC of the plurality of NCs to selectively activate the CDT of the NC to operate as an emulator of the CNF of the NC or as a test nodal of the CNF of the NC according to needs of network testing or other services;
and the TO selectively activating different sets of CDTs within the plurality of NCs, thereby forming different network testing topologies to perform network testing of the CNN.

2. A system for testing of a CNN with continuous integration and continuous delivery (CI/CD) of the CNN, the system comprising:
at least one processor;
and at least one memory coupled to the at least one processor, wherein the at least one memory has computer-executable instructions stored thereon that, when executed by the at least one processor, cause operations to be performed including:

electronically generating a plurality of NCs, wherein each NC of the plurality of NCs includes:

a containerized test agent (CTA);

a containerized network function (CNF);

and a containerized digital twin (CDT) of the CNF, wherein the CTA controls behavior of the CDT and the CDT is selectively configurable by the CTA to operate as an emulator of the CNF or as a test nodal of the CNF;

electronically providing a virtual router through which each NC of the plurality of NCs is accessible by a testing-as-a-service (TaaS) orchestrator (TO);

electronically defining a network Internet Protocol (IP) address coding scheme for each NC of the plurality of NCs enabling, for each NC of the plurality of NCs to have a respective unique IP subnet of the NC and the CNF included inside the NC to be directly accessed by the TO throughout the CNN via the virtual router;

electronically deploying each NC of the plurality of NCs using the respective unique IP subnet of the NC;

the TO electronically configuring and managing a test network topology of the CNN via a respective CTA in each NC of the plurality of NCs;

electronically cloning the CNN to form at least one network slice (NS);

electronically deploying each NC of a plurality of NCs of the at least one NS using a respective unique IP subnet of the NC, wherein each NC of the plurality of NCs of the at least one NS has a respective unique IP subnet of the NC and a respective CNF included inside the NC that is directly accessible by the TO throughout the at least one NS via a respective virtual router associated with the at least one NS;

a network orchestrator (NO) electronically managing the CI/CD of the CNN, wherein the TO is interconnected with the NO;

the TO electronically communicating with a respective CTA of each NC of the plurality of NCs to selectively activate the CDT of the NC to operate as an emulator of the CNF of the NC or as a test nodal of the CNF of the NC according to needs of network testing or other services; and the TO selectively activating different sets of CDTs within the plurality of NCs, thereby forming different network testing topologies to perform network testing of the CNN.

3. A non-transitory computer readable storage medium having computer-executable instructions stored thereon that, when executed by at least one processor, cause operations to be performed, the operations including:

electronically generating a plurality of network cells (NCs), wherein each NC of the plurality of NCs includes:

a containerized test agent (CTA);

a containerized network function (CNF);

and a containerized digital twin (CDT) of the CNF, wherein the CTA controls behavior of the CDT and the CDT is selectively configurable by the CTA to operate as an emulator of the CNF or as a test nodal of the CNF;

electronically providing a virtual router through which each NC of the plurality of NCs is accessible by a testing-as-a-service (TaaS) orchestrator (TO);

electronically defining a network Internet Protocol (IP) address coding scheme for each NC of the plurality of NCs enabling, for each NC of the plurality of NCs to have a respective unique IP subnet of the NC and the CNF included inside the NC to be directly accessed by the TO throughout the CNN via the virtual router;

electronically deploying each NC of the plurality of NCs using the respective unique IP subnet of the NC;

the TO electronically configuring and managing a test network topology of the CNN via a respective CTA in each NC of the plurality of NCs;

electronically cloning the CNN to form at least one network slice (NS);

electronically deploying each NC of a plurality of NCs of the at least one NS using a respective unique IP subnet of the NC, wherein each NC of the plurality of NCs of the at least one NS has a respective unique IP subnet of the NC and a respective CNF included inside the NC that is directly accessible by the TO throughout the at least one NS via a respective virtual router associated with the at least one NS;

a network orchestrator (NO) electronically managing the CI/CD of the CNN, wherein the TO is interconnected with the NO;

the TO electronically communicating with a respective CTA of each NC of the plurality of NCs to selectively activate the CDT of the NC to operate as an emulator of the CNF of the NC or as a test nodal of the CNF of the NC according to needs of network testing or other services; and the TO selectively activating different sets of CDTs within the plurality of NCs, thereby forming different network testing topologies to perform network testing of the CNN.

* * * * *